United States Patent [19]
Shibuya

[11] Patent Number: 5,803,517
[45] Date of Patent: Sep. 8, 1998

[54] VEHICULAR BUMPER BEAM AND METHOD FOR FABRICATING THE SAME

[75] Inventor: Akihiro Shibuya, Wako, Japan

[73] Assignee: Honda Giken Kogyo Kabushiki Kaisha, Tokyo, Japan

[21] Appl. No.: 671,552

[22] Filed: Jun. 27, 1996

[30] Foreign Application Priority Data

Jul. 7, 1995 [JP] Japan .................................... 7-172443

[51] Int. Cl.$^6$ ................................................. B60R 19/02
[52] U.S. Cl. ................................................. 293/120
[58] Field of Search ........................... 293/102, 120–122

[56] References Cited

U.S. PATENT DOCUMENTS

| | | | |
|---|---|---|---|
| 4,322,106 | 3/1982 | Nespor | 293/121 |
| 4,348,042 | 9/1982 | Serivo | 293/120 |
| 4,671,550 | 6/1987 | Molnar | 293/120 |
| 4,762,352 | 8/1988 | Enomoto | 293/120 |
| 4,998,761 | 3/1991 | Bayer et al. | 293/121 |
| 5,080,410 | 1/1992 | Stewart et al. | . |
| 5,154,462 | 10/1992 | Carpenter | 293/120 |
| 5,269,574 | 12/1993 | Bhutami et al. | 293/120 |
| 5,306,058 | 4/1994 | Sturrus et al. | 293/154 |
| 5,462,325 | 10/1995 | Masuda et al. | 293/121 |
| 5,584,518 | 12/1996 | Frank et al. | 293/155 |

*Primary Examiner*—David M. Mitchell
*Attorney, Agent, or Firm*—Armstrong, Westerman, Hattori, McLeland, and Naughton

[57] ABSTRACT

A vehicular bumper beam is comprised of a hollow member of high tension steel, which has a front corner portion with an inclined surface. With this arrangement, when a collision energy is applied obliquely to the corner portion of the bumper beam, the collision energy is received by the inclined surface. As a result, a small collision energy arising from a collision at a low speed can readily be absorbed while a large collision energy arising from a collision at a high speed can be transmitted to a vehicle body quickly and efficiently.

2 Claims, 8 Drawing Sheets

Fr ⇔ Rr

FIG.7A
FIG.7B
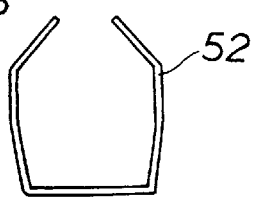
FIG.7C
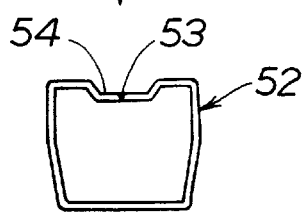
FIG.7D
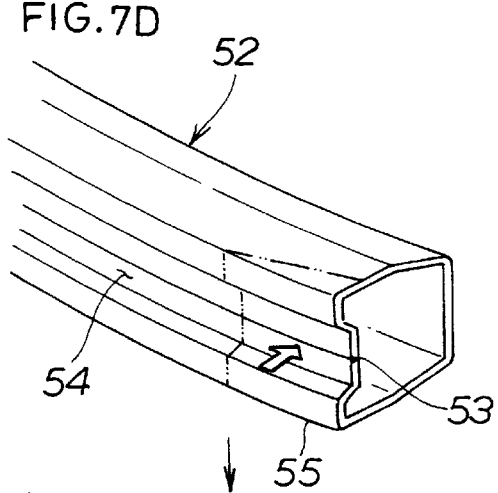
FIG.7E
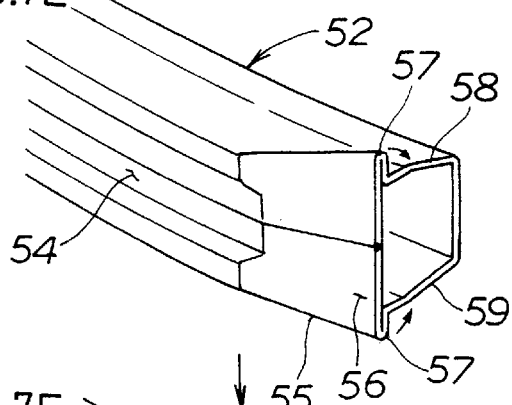
FIG.7F
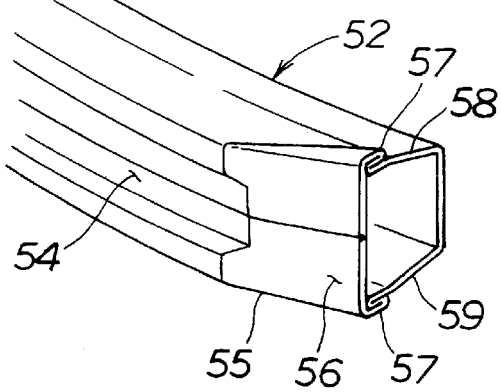

VEHICULAR BUMPER BEAM AND METHOD FOR FABRICATING THE SAME

BACKGROUND OF THE INVENTION

1. Field of the Invention

The present invention relates generally to a vehicular bumper beam and a method for manufacturing the same and, more particularly, to a vehicular bumper beam capable of efficiently absorbing or transmitting a collision energy applied obliquely to lengthwise ends thereof, to a vehicle body, as well as a method for manufacturing such bumper beam.

2. Description of the Related Art

Conventionally, various vehicular bumper beam mounting structures are known in which a bumper beam, which extends across or transversely of a vehicle body and is covered by a bumper face, is mounted to the frontal part of the vehicle body by means of a support. Generally, it is often required of bumpers to be capable of absorbing a small collision energy such as of a low-speed (approx. 8 km/hr or less) collision and to have good restoration capability. It is also demanded of the bumpers to be light in weight and to have high energy transmission capability.

One example of such bumpers is disclosed in U.S. Pat. No. 5,080,410 entitled "Vehicular Bumper Beam". The vehicular bumper beam is schematically shown in FIG. 8 hereof.

In FIG. 8, "Fr" and "Rr" represent forward and rearward directions of a vehicle body, respectively. "CL" represents a transverse center of the vehicle body. A bumper 100 is comprised of a bumper beam 101 extending transversely (up-and-down direction in FIG. 8) of the vehicle body, a cushion 102 covering a front side of the bumper beam 101, a bumper face 103 covering a front side of the cushion 102 and a side rail 104 (only one shown in FIG. 8) for securing vehicle-widthwise ends of the bumper beams 101 to the vehicle body.

The bumper beam 101 is made from high tension steel and takes the form of a rectangular hollow member cut off at both ends. As a result, the bumper beam 101 has an angled corner portion 101a (only one shown in FIG. 8) at a front side of each end thereof.

A collision energy f is often applied obliquely to the beam corner portion 101a at the front side of the bumper beam 101. Even in such instance, it is required of the bumper beam 101 to be restorable or bendable to absorb the collision energy as the latter is that of a low speed (approx. 8 km/hr or less) collision and to be crushable to efficiently transmit the energy to the vehicle body as the energy is that of a high speed (approx. 8 km/hr or more) collision.

However, it is difficult for the bumper beam 101 as shown in FIG. 8 to fully satisfy the foregoing requirements since its corner portion 101a is angled.

From a design aspect of the bumper face 103, its face corner portions 103a (only one shown in FIG. 8) are normally curved. Consequently, a space between the angled beam corner portion 101a and the curved face corner portion 103a is relatively small compared to other portions. It is thus inevitable that the cushion 102 becomes thin at the beam corner portion 101a. As a result, a small collision energy f applied obliquely to the corner portions 101a, 103a at the front side of the bumper beam 100 may not be absorbed efficiently.

SUMMARY OF THE INVENTION

It is therefore an object of the present invention to provide a bumper beam which is capable of efficiently absorbing a small collision energy such as that of a low speed collision and of quickly and efficiently transmitting a large collision energy such as that of a high speed collision, to a vehicle body.

Another object of the invention is to provide a method of manufacturing such bumper beam.

According to the present invention, there is provided a bumper beam which takes the form of a hollow member of high tension steel and has inclined surfaces at front corner portions of the lengthwise ends thereof.

Such arrangement leads to the advantages that when a collision energy is applied obliquely to the front corner portions, such energy can be received by the inclined surfaces and hence be readily absorbed as the energy is a small one resulting from a low speed collision and be quickly and efficiently transmitted to the vehicle body as the energy is a large one resulting from a high speed collision.

Further, by virtue of the inclined surfaces of the front corner portions, spaces between the front corner portions of the bumper beam and the corner portions of the bumper faces can be increased. As a result, the collision energy applied obliquely to the front corner portions of the bumper beam can be more efficiently absorbed by the cushion.

Since the front corner portions of the bumper beam are not angled, it becomes possible to prevent the bumper face from being damaged by colliding with the front corner portions of the bumper beam when a collision energy is applied obliquely to the lengthwise ends of the bumper.

Preferably, the angle of inclination of the inclined surfaces is about 60° from the transverse center of a vehicle.

The upper and lower edges of the inclined surfaces, which project from the hollow member, are formed by folding along the external surface of the upper and lower sides of the hollow member. Thus, the bumper beam has no projections on the outer peripheral surfaces of the vehicle-widthwise (longitudinal) ends thereof, whereby the positioning of the bumper beam and setting of the positional relations between the bumper beam and bumper face are rendered easy.

Preferably, the bumper beam takes the form of a rectangular hollow member made of high tension steel, with the inclined surfaces being formed by squashing the front corner portions of the hollow member with the upper and lower edges of the to-be-pressed surfaces projected outwardly of the hollow member. The inclined surfaces can thus be formed on the front corner portions by an extremely easy process of squashing only.

BRIEF DESCRIPTION OF THE DRAWINGS

A preferred embodiment of the present invention will hereinafter be described, by way of example only, with reference to the accompanying drawings, in which:

FIG. 7A–FIG. 7F illustrate the processes for manufacturing the vehicular bumper beam according to the present invention.

DETAILED DESCRIPTION OF THE PREFERRED EMBODIMENT

Figure 1:
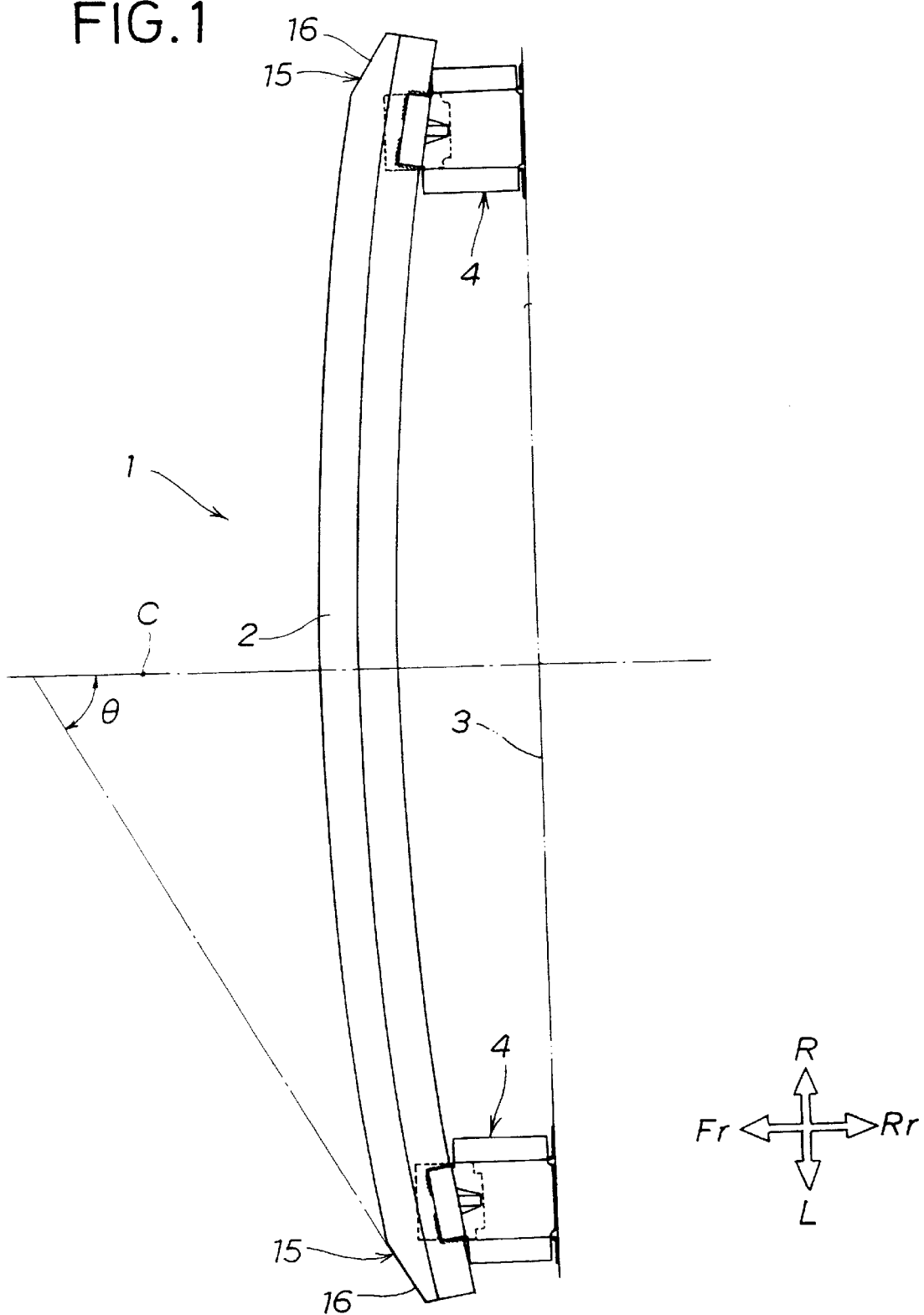
FIG. 1 is a top plan view of a vehicular bumper beam according to the present invention.

In the drawings, "front", "rear", "left", "right", "up" and "down" represent directions as viewed from a vehicle driver. Similarly, "Fr", "Rr", "L" and "R" respectively represent front, rear, left and right sides. "CL" represents a transverse center of a vehicle.

Referring initially to FIG. 1, a front bumper is shown which is to be mounted to a front side of a vehicle body. A bumper 1 includes a bumper beam 2 extending transversely (in an up-and-down direction in FIG. 1) of the vehicle body, a bumper face 6 (discussed in relation to FIG. 3) for covering a front side of the bumper beam 2 and a pair of right and left supports 4, 4 for securing the vehicle-widthwise ends of the bumper beam 2 to the vehicle body 3. The bumper beam 2 is bent or projects forwardly and thus has an arc shape.

Figure 2:
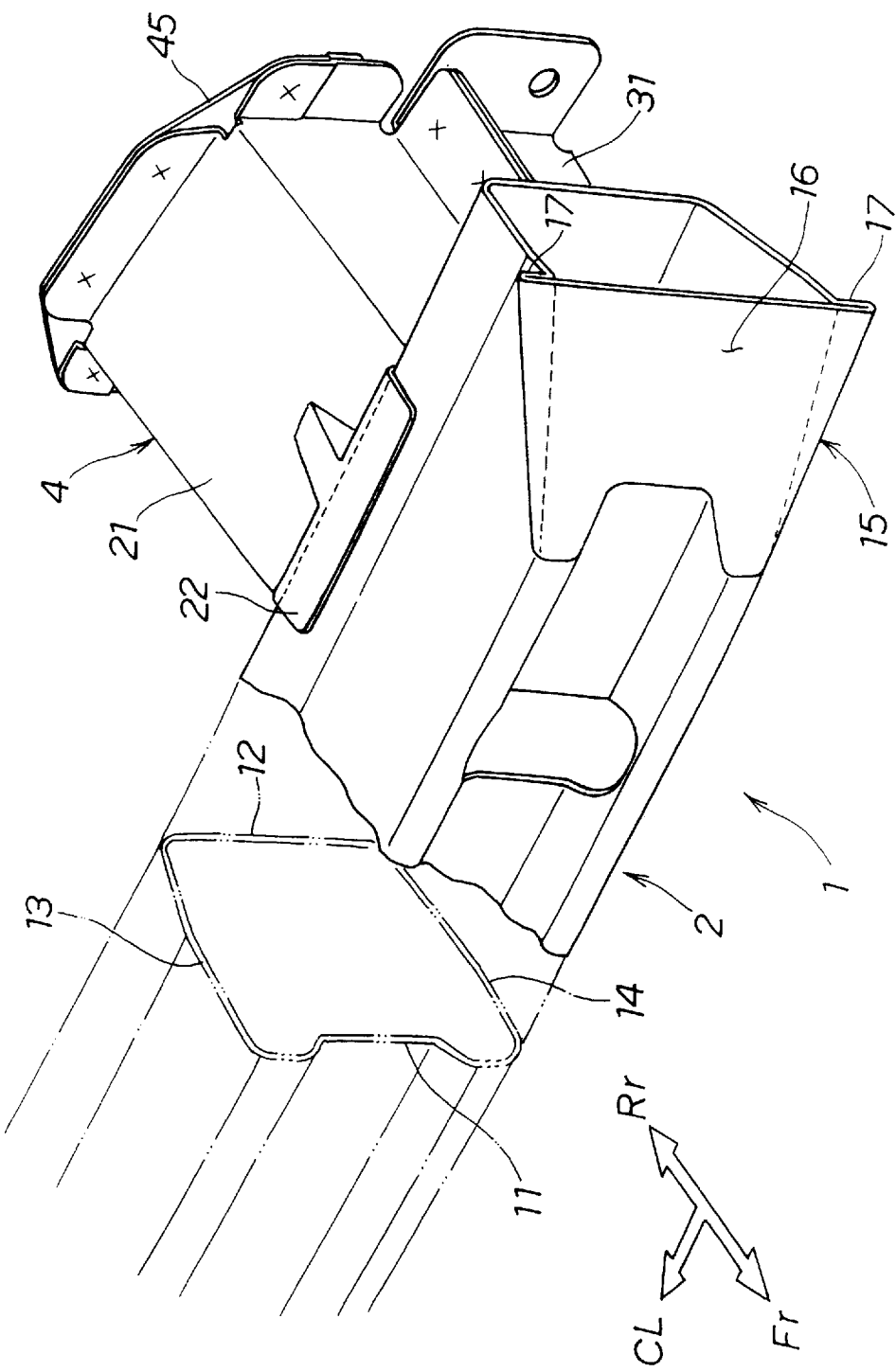
FIG. 2 is a perspective view showing, on an enlarged scale, a corner portion of the vehicular bumper beam according to the present invention.

Turning now to FIG. 2, there is shown a mount structure for mounting a left part of the bumper beam to the vehicle body. Left and right bumper beam mount structures are arranged symmetrically. Although only the left side bumper beam mount structure will be discussed hereinbelow, operation of the right side bumper beam mount structure is identical to that of the left side bumper beam mount structure.

Bumper beam 2 is in the form of a rectangular hollow member made of high tension steel so that on one hand it is light in weight while on the other hand it is rendered highly capable of absorbing a collision energy or otherwise transmitting the collision energy to the vehicle body.

High tension steel is meant to be steel materials having high tensile strength. Weldability and processing characteristics are important factors in selecting such materials. The high tension steel for use in the embodiment being discussed may be a cold rolled steel plate for automobile construction (AISI-120XF). "AISI" is an abbreviated form of the name of the American Iron and Steel Institute.

As shown by phantom lines in FIG. 2, the bumper beam 2 has a substantially rectangular hollow cross section defined by a front side portion 11 opposite from the vehicle body, a rear side portion 12, an upper side portion 13 and a lower side portion 14. The bumper beam 2 is tapered outwardly in that it includes inclined surfaces 16 formed at front corner portions 15 (only the left one is shown in FIG. 2) of the vehicle-widthwise (longitudinal) ends of the front side portion 11. The inclined surfaces 16 have upper and lower edges 17 projecting outwardly from the upper side portion 13 and lower side portion 14.

The inclined surfaces 16 are inclined by an angle θ from the vehicle transverse center line C, which, in the illustrated example, is about 60°, as shown in FIG. 1.

Figure 3:
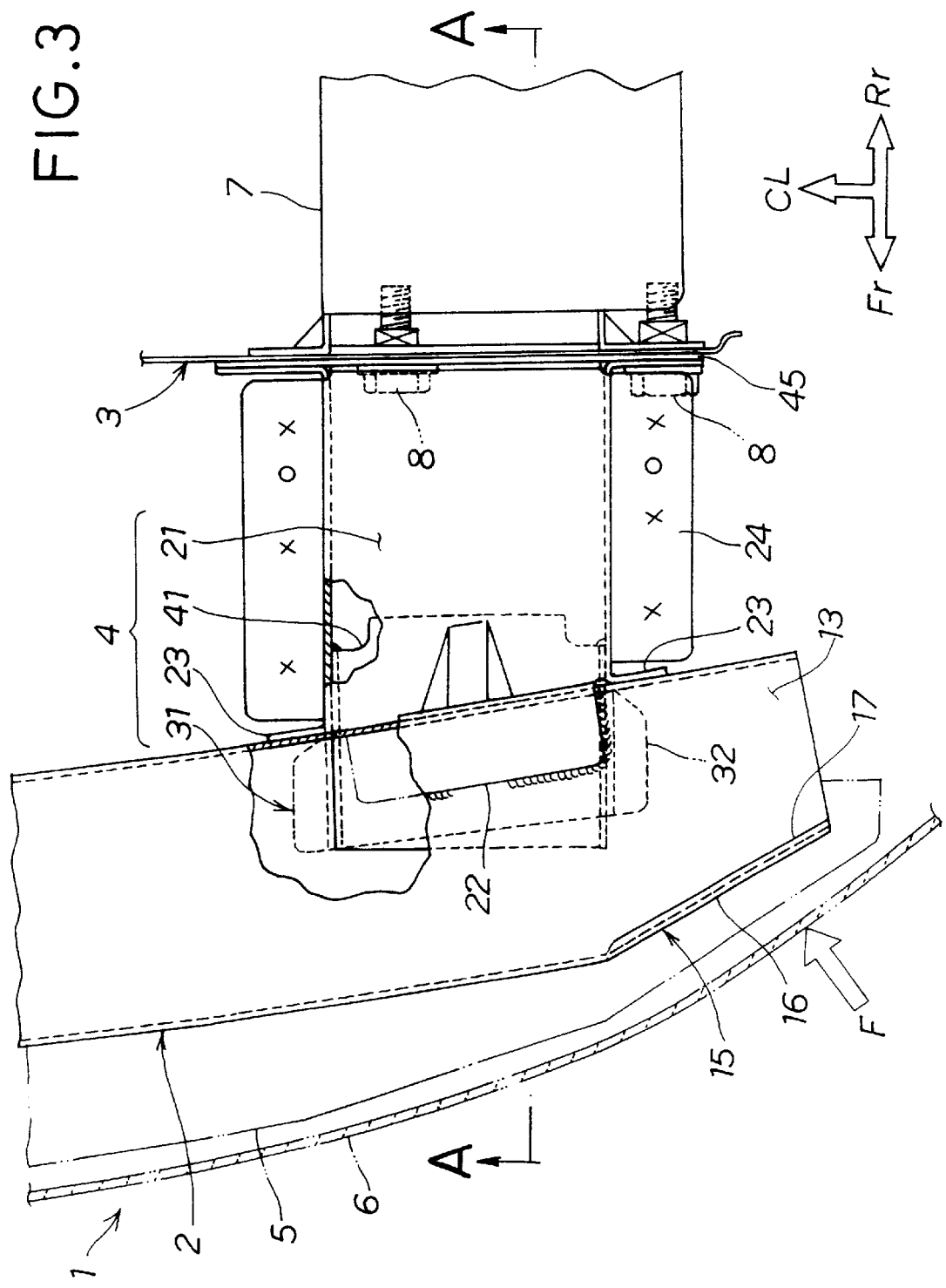
FIG. 3 is a top plan view of the bumper beam, partially cut away, of Fig. 2.

In FIG. 3, front part of the bumper beam 2 is covered by a cushion 5, a front surface of which is in turn covered by a bumper face 6.

Cushion 5 is designed to absorbing a collision energy and made from, e.g., polypropylene foam materials. The bumper face 6 is provided for the purpose of aesthetics of the bumper and associates portions of the vehicle and made from, e.g., plastic materials.

Figure 4:
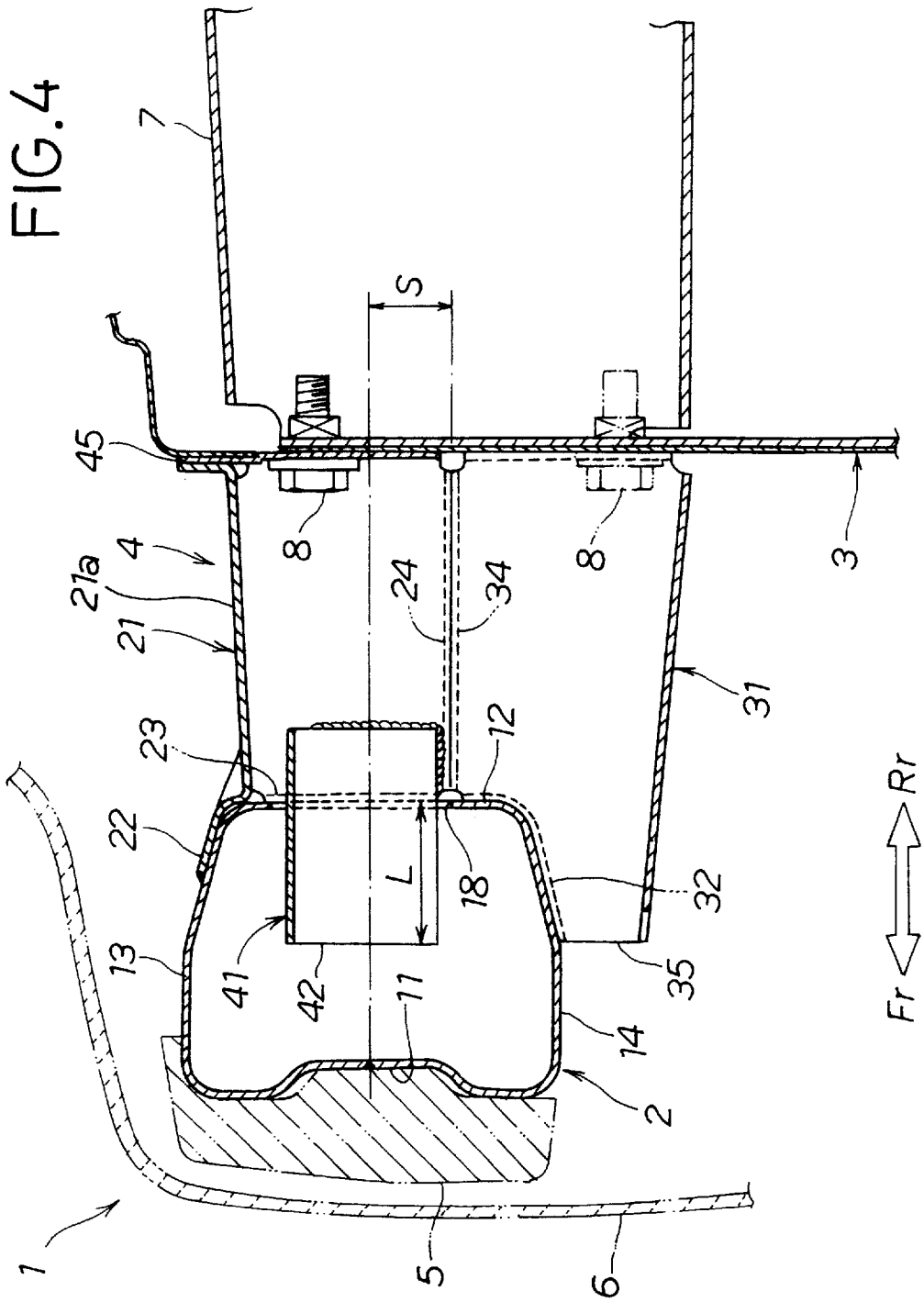
FIG. 4 is a cross-sectional view taken along line A—A of FIG. 3.

As shown in FIG. 4, the bumper beam 2 is formed by folding a steel plate and is weld connected at a heightwise center.

Support 4 is comprised of a first split half 21 with a downwardly directed channel-shaped cross section and a second split half 31 with an upwardly directed channel-shaped cross section, which is laid upon the first split half 21 to present a box-like configuration. The first split half 21 and second split half 31 are connected together by spot welding flanges 24, 34 laid one over the other.

Support 4 is connected at its front end to the bumper beam 2 by welding and at its rear end to a side frame 7 of the vehicle body 3 by means of bolts 8, 8. The side frame 7 extends in a front-to-rear direction at each side of the vehicle body 3 and forms part of the vehicle body.

First split half 21 has a top end flange 22 weld connected to the upper side portion 13 of the bumper beam 2 and a side end flange 23 weld connected to the rear side portion 12 of the bumper beam 2. Similarly, the second split half 31 has a top end flange 32 weld connected at a portion spanning between a lower part of the rear side portion 12 of the bumper beam 2 and the lower side portion 14.

First split half 21 is comprised of a first split half body 21a and a separate extension member (top end) 41 extending from the top end center of the body 21a. The extension member 41 has a downwardly directed channel-shaped cross section and is fitted between the side walls of the first split half body 21a and weld connected, whereby it forms part of the top end of the first split half 21.

Extension member 41 is inserted through an opening 18 provided in the rear side portion 12 of the bumper beam 2 such that it does not touch any part of the bumper beam 2. The length (depth) L of insertion of the extension member 41 is chosen to be such that a front end (point of application) 42 of the extension member 41 is generally aligned, in a front-to-rear direction with respect to the vehicle, with a front end (point of application) 35 of the second split half 31.

By inserting the extension member 41 (front end of the first split half 21) through the opening 18 of the bumper beam 2 and arranging the front end of the second split half 31 to extend along the lower side portion 14 of the bumper beam 2, the bumper beam 2 is inevitably offset or displaced in a heightwise direction relative to the side frame 7. Since the extension member 41 (front end portion of the first split half 21) is inserted through the opening 18 of the bumper beam 2 and the rear and lower side portions 12, 14 of the bumper beam 2 are supported on an upper cutout portion of the front end portion of the second split half 31, the bumper beam 2 is offset or displaced upwardly relative to a central axis of the side frame 7 by a distance S. In other words, the configuration and dimension of the opining 18 of the bumper beam 2, the front end portion of the second split half 31 and the extension member 41 are determined taking the offset dimension S of the bumper beam 2 into consideration.

Reference numeral 45 designates a rear panel for enclosing the rear end of the first split half 21, which is connected to an adjacent flange of the first split half 21 by spot welding.

Figure 5:
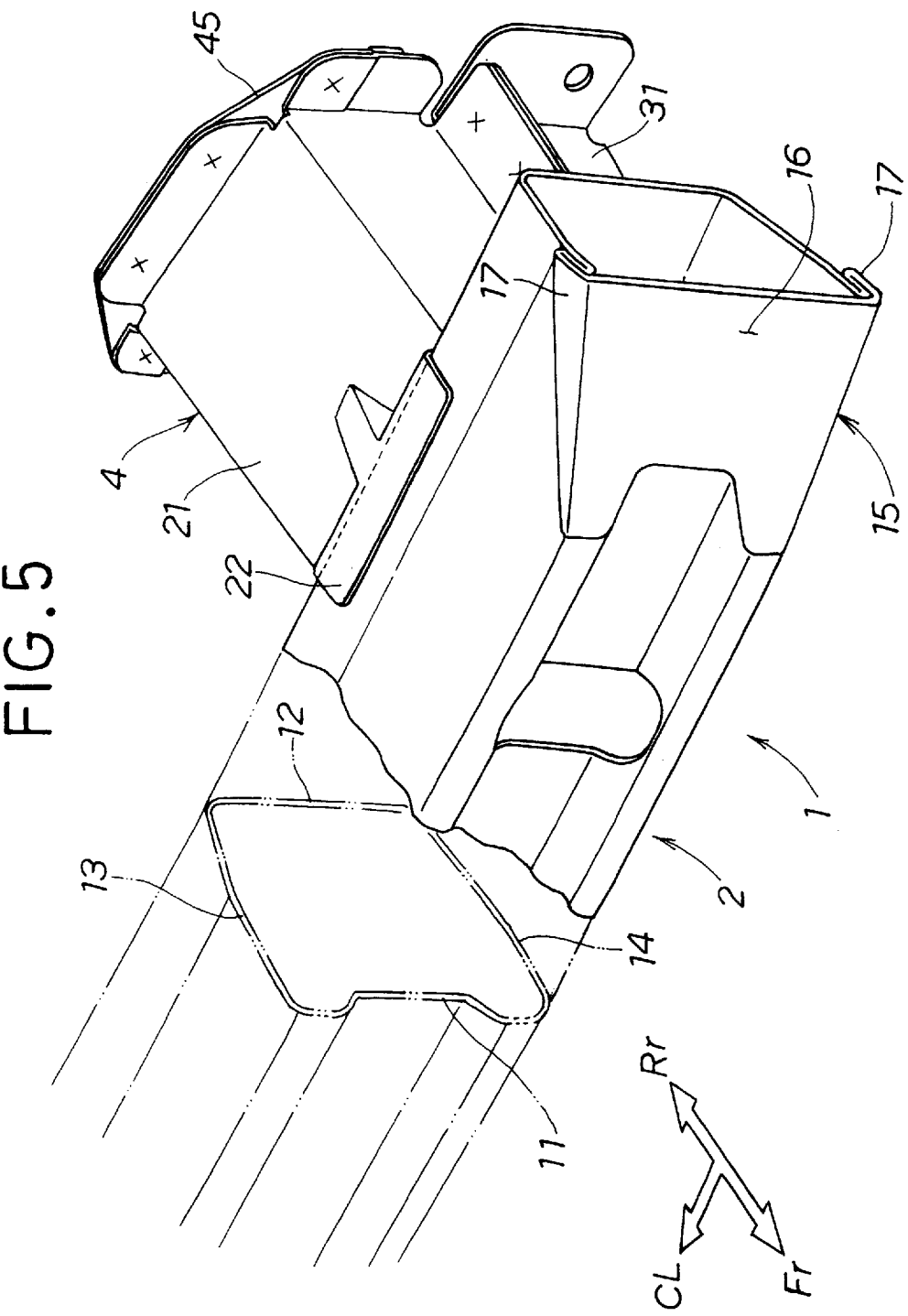
FIG. 5 is a view similar to FIG. 2 but showing an alteration of the vehicular bumper beam.

In FIG. 5, an alteration of the bumper beam 2 is shown. The upper and lower edges 17, 17 of the inclined surface 16 are formed by folding along the upper and lower side portions 13, 14 of the hollow bumper beam 2.

Figure 6:
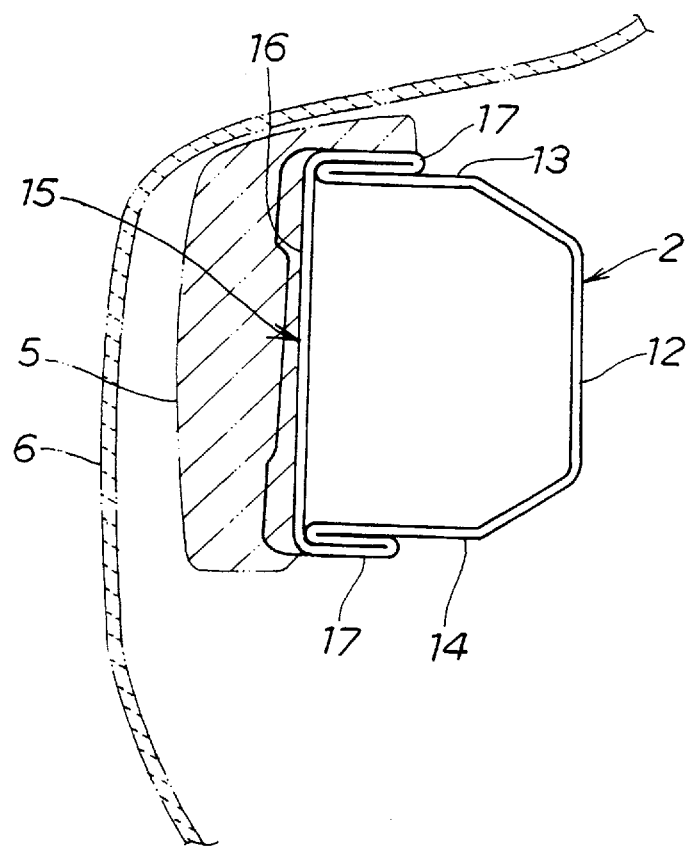
FIG. 6 is a side elevational view of the bumper beam shown in FIG. 5.
Figure 8:
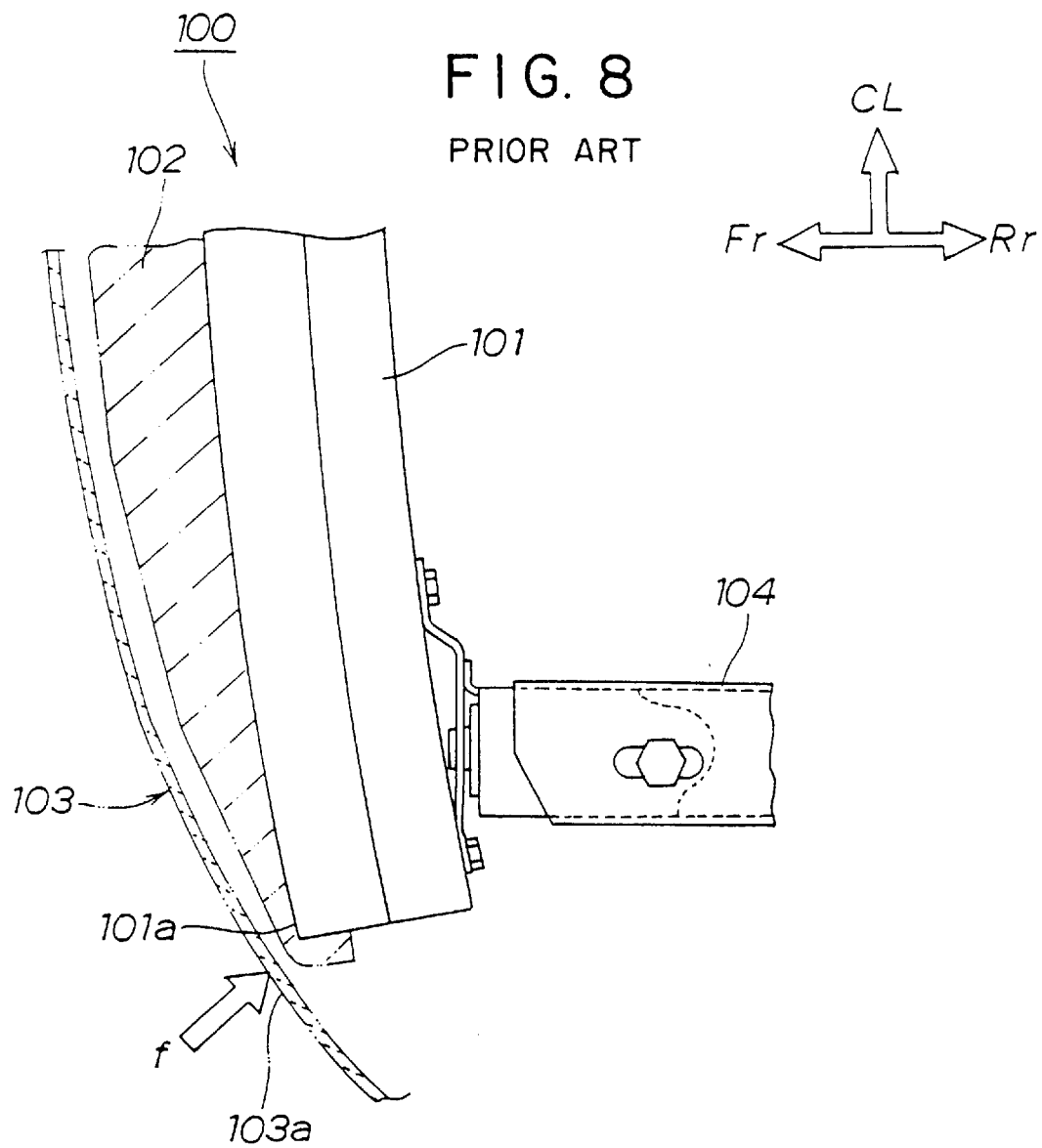
FIG. 8 is a schematic view illustrating, on an enlarged scale, part of a own bumper beam.

FIG. 6 illustrates the positional relations between the front corner portion 15 of the bumper beam 2 and the bumper face 6 shown in FIG. 5.

Since the upper and lower edges 17, 17 of the front corner portion 15 of the hollow member as the bumper beam 2 are folded to extend along the outer surfaces of the bumper beam 2 as discussed above, there are no projections formed around the front corner portion 15 of the hollow member. As a result, the space around the hollow member can be used effectively. Further, the positioning of the bumper beam 2 and the positional relations between the bumper beam 2 and the bumper face 6 can be determined with easy, whereby restrictions encountered in vehicle designing can be mitigated.

Referring to FIG. 7A–FIG. 7F, description will now be made as to the method of manufacturing the vehicular bumper beam arranged as above.

Firstly, there is provided a flat high tension steel plate 51 as shown in FIG. 7A. The steel plate 51 is then subjected to a roll shaping process to provide a hollow member 52 of rectangular cross section as shown in FIG. 7B.

Thereafter, as shown in FIG. 7C, the hollow member 52 is brought into its final form by weld connecting abutting ends 53. It should be noted that in Fig. 7C, a portion 54, which corresponds to the front side portion 11 of the bumper beam 2 shown in FIG. 2 and hence will hereinafter be referred to as "front side equivalent portion, forms the upper side portion for the convenience of manufacture.

After the hollow member 52 is cut into a predetermined length as the required bumper beam, the hollow member 52 is rolled to be longitudinally bent so as to make the front side equivalent portion 54 become the front side portion, as shown in FIG. 7D.

In FIG. 7D, operation continues to provide the front corner portion 55 (only one shown) of the front side equivalent portion 54 of the hollow member 52 with an inclined surface 56. In this instance, the portion shown by a phantom line in FIG. 7D is press shaped. In other words, with the upper and lower edges 57, 57 of the front side equivalent portion 54 (side to be pressed) projected outwardly as shown in FIG. 7E, the front corner portion 55 of the hollow member 52 is pressed into a crushed state to thereby provide an inclined surface 56. The hollow member 52 shaped as in FIG. 7E constitutes the bumper beam of FIG. 2.

Thereafter, in FIG. 7E, the edges 57, 57 projecting from the upper and lower portions of the front side equivalent portion 54 are crushed by a press work. In this instance, as shown in FIG. 7F, the hollow member 52 is completed by folding the edges 57, 57 projecting along an upper side portion 58 and a lower side portion 59, which form the side portions of the hollow member 52. The hollow member 52 shown in FIG. 7F constitutes the altered form of the bumper beam 2 shown in FIG. 5.

The foregoing procedures for producing the bumper beam 2 are given only for assisting in understanding of the above arrangement. It will readily be perceived by those versed in the art that other procedures are also possible.

Operation of the vehicular bumper arranged as discussed above will hereinafter be described with reference to FIG. 3 and FIG. 4.

Referring to FIG. 4, when a small collision energy arising from a collision at a low speed (approx. 8 km/hr or less) is applied to the bumper 1 from a fore side thereof, such collision energy will be absorbed by the elastic deformation of the cushion 5 and bumper beam 2. The bumper beam 2 is designed not to be plastically deformed by such low speed collision energy. As the low speed collision energy disappears, the bumper beam 2 restores its original shape.

When a large collision energy is applied to the bumper 1 from a fore side thereof, the bumper beam 2 undergoes plastic deformation in correspondence with the size of the applied collision energy. As the bumper beam 2 is plastically deformed significantly, the deformed bumper beam 2 collides with the extension member 41. At this point in time, the collision energy is applied to the first split half 21 via the extension member 41, as well as to the front end of the second split half 31. Thus, since the application points 35, 42 of the collision energy with respect to the first and second split halves 21, 31 are aligned with each other, the collision energy is applied thereto substantially equally. As a result, notwithstanding the bumper beam 2 being offset in a height direction with respect to the side frame 7, the collision energy is transmitted quickly and equally to the front end of the side frame 7. The collision energy transmitted to the side frame 7 is absorbed by the vehicle body 3.

Referring back to FIG. 3, when the collision energy F is applied obliquely to the front corner portion 15 of the bumper beam 2, the collision energy F is received by the inclined surface 16. Therefore, when a small collision energy F arising from a collision at a low speed (approx. 8 km/hr or less) is applied obliquely to the front corner portion 15 of the bumper 1, the collision energy is absorbed by the elastic deformation of the cushion 5 and the front corner portion 15 of the bumper beam 2. The cushion 5 and the bumper beam 2 restore their original shapes by their resiliency as the collision energy disappears.

When a large collision energy F arising from a collision at a high speed (approx. 8 km/hr or more) is applied obliquely to the front corner portion 15 of the bumper 1, the bumper beam 2 deforms plastically in correspondence with the magnitude of the collision energy and transmits the energy through the support 4 to the vehicle body 3 quickly and efficiently.

It may be readily understood by those skilled in the art that in the embodiment and its alteration thus far explained, the bumper 1 is not limited to the use as a front bumper but may also be used as a rear bumper to be mounted to the rear side of the vehicle body 3. Obviously, various minor changes and modifications of the present invention are possible in the light of the above teaching. It is therefore to be understood that within the scope of the appended claims the invention may be practiced otherwise than as specifically described.

What is claimed is:

1. A vehicular bumper beam, comprising:
    a hollow member mounted to a front side or rear side of a vehicle and extending transversely with respect thereto, said hollow member having an upper side portion, a front side portion, a lower side portion and a rear side portion, each extending longitudinally between opposite ends of said hollow member to form a singular spaced box member;
    said front side portion having an inclined surface at a front corner portion of said hollow member, said inclined surface being inclined toward said rear side portion and extending from said lower side portion to said upper side portion;
    wherein said hollow member is made from high tension steel; and
    wherein said inclined surface of said front side portion further extends outwardly from said upper side portion and said lower side portion to form a folded upper edge and lower edge, said upper and lower edges extending along an external surface of said hollow member.

2. The vehicular bumper beam according to claim 1, wherein said inclined surface is inclined substantially 60° from a transverse center of said vehicle.

* * * * *